United States Patent [19]
Crystal

[11] Patent Number: 6,132,095
[45] Date of Patent: Oct. 17, 2000

[54] LOW FRICTION SLIDING BEARING FOR AN AXIAL SHAFT

[75] Inventor: Kevin R. Crystal, Chanhassan, Minn.

[73] Assignee: MacDermid Incorporated, Waterbury, Conn.

[21] Appl. No.: 09/251,950

[22] Filed: Feb. 17, 1999

[51] Int. Cl.$^7$ .................................................... F16C 33/00
[52] U.S. Cl. ............................................. 384/125; 384/432
[58] Field of Search .................... 384/125, 300, 384/432, 434, 444

[56] References Cited

U.S. PATENT DOCUMENTS

| | | | |
|---|---|---|---|
| 3,929,395 | 12/1975 | Stojek | 384/432 |
| 5,288,152 | 2/1994 | Davies | 384/125 X |
| 5,522,666 | 6/1996 | Tanaka | 384/125 |
| 5,709,482 | 1/1998 | Lutz | 384/434 |
| 5,711,614 | 1/1998 | Wuest et al. | 384/432 X |
| 5,718,466 | 2/1998 | Weinerman et al. | 384/432 X |

*Primary Examiner*—Charles A Marmor
*Assistant Examiner*—Ha Ho
*Attorney, Agent, or Firm*—Paul H. McDowall

[57] ABSTRACT

An apparatus for reliably and efficiently propelling a printing substrate across a printing platen by use of the known roller/nip roller configuration wherein an improved, unitary slider bearing preferably formed of low friction material is coupled to an axial shaft at two points of contact to a upper crown of a slider bearing. The improved bearing is preferably constructed of teflon, or similar low friction material, impregnated resin and formed to create a friction fit in an aperture in a printing platen of a print engine. The improved bearing allows use of a lower cost, less-toleranced axial drive shaft members and eliminates use of typical ball-bearing style bearing assemblies as well as greatly reduces assembly time of the roller, nip roller, axial shaft combination during initial build of the print engine. The improved bearing preferably includes a debris cut-out so that any debris that might collect inside the bearing structure (between the axial shaft/roller and bottom portion of the bearing) can escape without causing any mechanical abrasion to the components of the improved bearing.

14 Claims, 4 Drawing Sheets

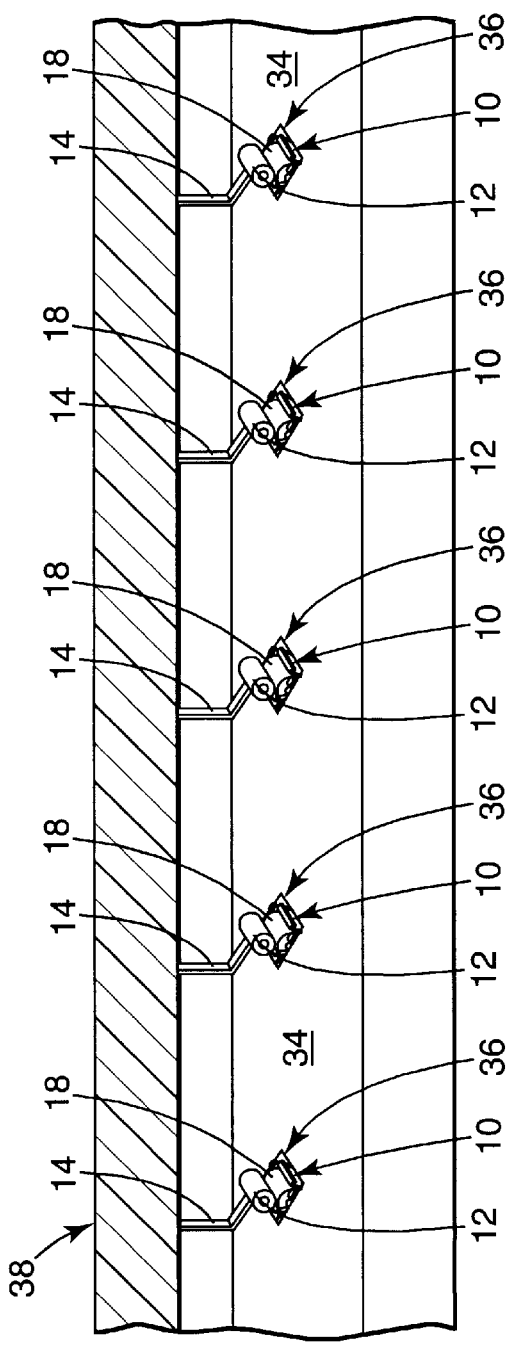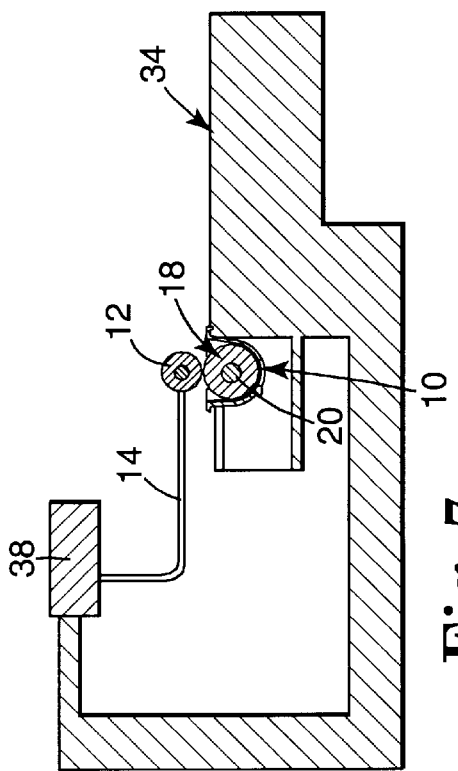

LOW FRICTION SLIDING BEARING FOR AN AXIAL SHAFT

FIELD OF THE INVENTION

The present invention relates generally to the field of printing. In particular, an improved low friction sliding bearing apparatus for engaging an axial shaft member used to transmit rotation to one or more friction rollers seated in apertures in a printing platen and designed to engage a printing media in cooperation with at least one nip roller biased against said friction rollers.

BACKGROUND OF THE INVENTION

The present invention addresses a need in the art to simplify assembly and enhance operation of print engine components that interact with a printing substrate to ensure constant, steady advancement of the printing media relative to one or more print heads. In large format ink jet print engines a plurality of rollers driven by an axial shaft have heretofore been highly toleranced, multi-component parts. The axial shaft itself is typically fabricated to minimize tolerance run-out and is supported on at least two (2) bearing assemblies coupled to each end of the axial shaft. Thus, as a result of the need for precision parts, and tight dimensional tolerances, the assembly of such prior art grit rollers has been a tedious part of building quality paper drive mechanisms. The function of such complex prior art drive mechanisms thus relies primarily on tightly toleranced engineering design, precise part fabrication, and nimble component assembly skills. Each of these needs and requirements add cost, complexity, and assembly time for the successful performance of these diverse tasks to ultimately produce a smooth running, quality end product.

The basic design criteria for driving a printing media with sets of grit rollers and nip rollers are simple. As long as each grit roller is sized equally, the axial shaft is perfectly straight, the bearings supporting the axial shaft operate smoothly, and the final assembly of all parts is completed as planned, the grit roller will consistently cooperate with a corresponding nip roller to form a discrete driving footprint for propelling the printing media at a constant velocity.

In the prior art many discrete piece parts are typically used in the installation and operation of these critical grit roller bearings. A significant obstacle to reducing cost and assembly efforts for prior art roller mechanisms lies in the abundance of parts of the prior art roller bearings, since inventory, assembly, service, and replacement operations are all negatively impacted. For example, in the exemplary embodiment taught herein a single axial shaft spans an internal compartment in a large format ink jet printer having a platen/printing zone of between three feet (3') and six feet (6') wide. The axial shaft thus drives a plurality of grit rollers in cooperation with corresponding nip rollers that in prior art systems would require that the axial shaft possess an extremely high final machined tolerance. The cost of highly machined axial shafts coupled with the assembly and service complexity of prior art grit roller assemblies, and specifically, bearings are both positively impacted when replaced by the apparatus of the present invention.

The present invention thus finds utility over a variety of printing platforms that operate to simply and accurately propel each roller at a desired location in apertures formed in a printing platen without regard to any tolerance run-out of an axial shaft used to drive the rollers and with a minimum of individual parts needed for final assembly.

SUMMARY OF THE INVENTION

The apparatus of the present invention thus increases the precision for controlling discrete nip roller/roller combinations with a unitary resin-based self-lubricating slider bearing designed to seat itself with a friction fit into an aperture formed in a platen surface proximate a printing zone of a large format ink jet print engine. Because the bearing in effect supports the axial shaft at each side of the roller member, no additional bearings are needed and as long as the tolerance run-out of the segment of axial shaft between a first and second axial bearing/support feature of the present inventive component is relatively low, a huge improvement in performance, ease of assembly, and performance immediately results.

In a preferred embodiment, the inventive sliding bearing is fabricated of a low friction material, or impregnated or coated with teflon® brand coating or equivalent, at least at the discrete locations where the axial shaft touches the bearing in the c-shaped channel. An integrated spring biasing force is provided by a single finger member which is formed to be slightly larger at its periphery than the aperture in which the apparatus is inserted. Thus, a friction-fit integral member that may be rapidly and efficiently assembled crates a highly accurate position for each of a set of grit rollers. The grit rollers are typically coupled to the axial shaft and the axial shaft is driven by a stepper motor or servo motor which preferably contains a rotary position encoder so that the radial position of the axial shaft over a large range of micro-steps (e.g., 1000 or more) may be accurately indicated and thereby a high degree of control over the motion of a printing substrate in contact with the grit rollers of the present invention may be had.

The following figures are not drawn to scale and only detail a few representative embodiments of the present invention, more embodiments and equivalents of the representative embodiments depicted herein are easily ascertainable by persons of skill in the digital imaging arts.

DESCRIPTION OF THE DRAWINGS

FIG. 6 is a perspective view of a five friction-roller paper-driving arrangement useful for large format ink jet printing wherein the axial shaft resides in a roller bay space inside of the printing platen and only a portion of each grit roller protrudes through the upper surface of said platen and each roller receives a biased nip roller which is suspended from an upper rail structure to assist in propelling printing media across the printing platen.

FIG. 7 is a cross sectional view depicting the axial shaft bay within the printing platen member, the grit roller protruding through the platen surface through a formed aperture and a cooperating nip roller and nip roller support shaft used for propelling printing media across the platen.

DESCRIPTION OF PREFERRED EMBODIMENT

Figure 1:
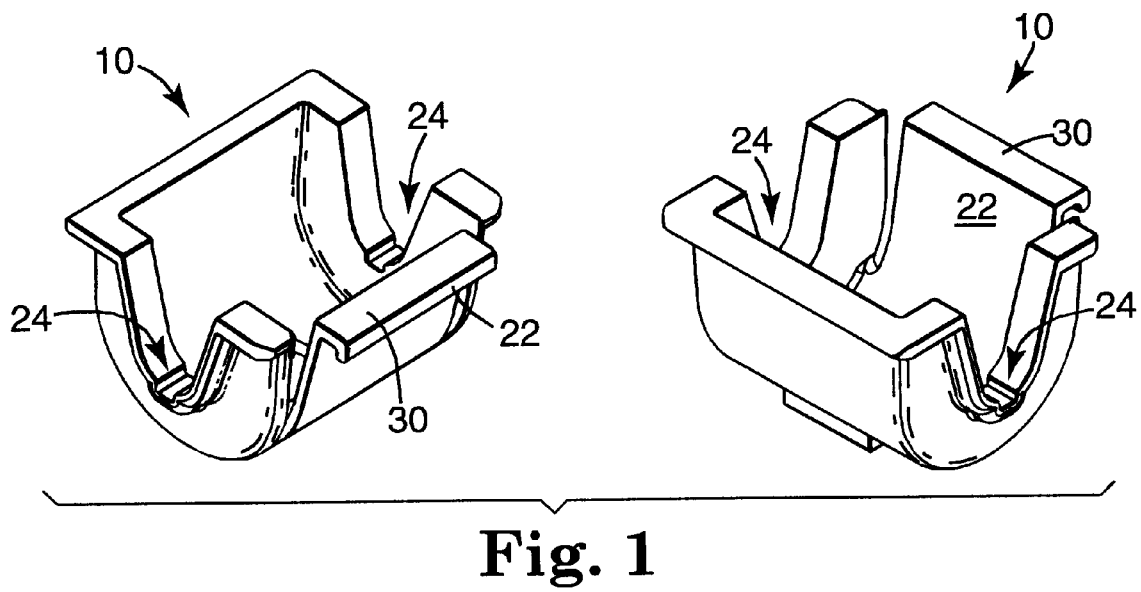
FIG. 1 depicts two perspective views of a preferred embodiment of the present invention wherein all features of the self-lubricating slider bearing structure are depicted.

The present invention is first described primarily with reference FIG. 1, two perspective views of a preferred embodiment of the present invention wherein all features of the sliding bearing structure are depicted. As can be seen, the sliding bearing 10 is preferably constructed as a unitary piece having multifunctional capabilities. Two substantially identical channel cut-outs 24 in opposing sides of bearing 10 each exhibit at least two bosses 26,28 (see FIG. 2) which provide discrete support points for an axial shaft (20 in FIG. 3, used to drive a grit roller 18 which is driven by said shaft 20 which in turn is coupled to remote drive mechanism (not shown). An integral spring-biasing member 22 is fabricated to deflect slightly and thus impart a retaining friction force when the bearing 10 is inserted into an appropriately sized aperture (36 in FIG. 6). A lip feature at the distal end of member 22 provides structure which preferably corresponds to an edge portion of said aperture 36 so that the upper portions of bearing 10 do not protrude above a plane defined by the periphery of said aperture 36 and thereby do not create any obstruction to a printing media passing over said plane (e.g., platen 34 in the exemplary embodiment).

Figure 2:
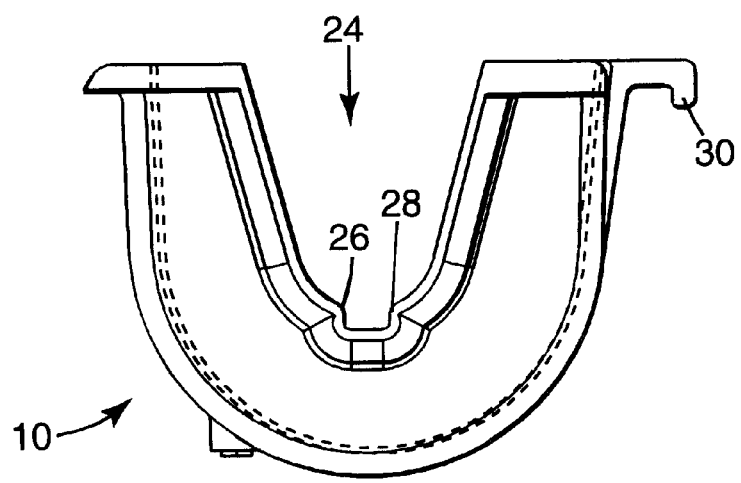
FIG. 2 is an elevation view of the inventive slider bearing structure illustrating the detail of the two identical shaft-receiving channels, and discrete contact points, which are formed in opposing sides of the inventive sliding bearing structure of the present invention.

Referring now to FIG. 2, which is an elevation view of the inventive sliding bearing structure 10 illustrating the detail of the two identical shaft-receiving channels 24, and discrete contact points 26,28, which are formed in opposing sides of the inventive slider bearing structure 10 of the present invention. Furthermore, the lip portion 30 of spring member 22 and the planar nature of the upper portion of the bearing 10 can be appreciated with reference to FIG. 2. Preferably the bearing member 10 is fabricated of a low friction material to promote rotation of axial shaft 20 and thus grit roller 18. Initially, the slider bearing 10 has discrete contact points 26,28 but within a short period of service these points 26,28 will wear in to form a cylindrical seat surface which nearly perfectly conforms to the actual surface of the axial shaft 20 over the area of contact between axial shaft 20 and the "points" 26,28 (now worn to 'surfaces' 26,28). Also, the walls 24 are a close fit to shaft 20 and will provide substantial support for any large "side load" forces bear on the axial shaft 20, for example, due to acceleration of the media or from a bow-shape or other irregularity in the axial shaft 20. In similar embodiment, a low-friction coating can be applied to the contact points 26,28 to promote rotation of shaft 20.

Figure 3:
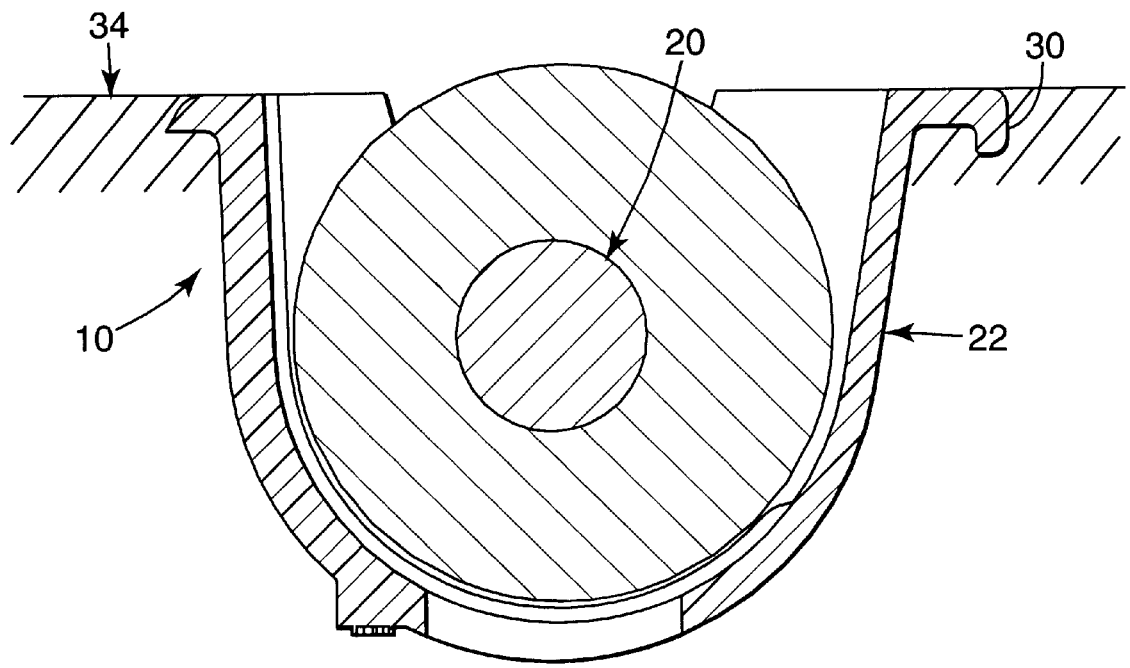
FIG. 3 is a cross sectional view of the inventive slider bearing structure illustrating the detail of the structure intermediate between the two identical shaft-receiving channels of one embodiment of the present invention wherein the spring biasing portion of the structure, and the attendant mounting lip, is shown in the hatched portions of FIG. 3.

Referring now to FIG. 3, which is a cross sectional view of the inventive slider bearing structure 10 illustrating the detail of the structure intermediate between the two identical shaft-receiving channels 24 of one embodiment of the present invention wherein the spring biasing portion 22 of the structure, and the attendant mounting lip 30, is shown in the hatched portions of FIG. 3. The axial shaft 20 is shown in position where shaft 20 contacts only the discrete contact points 26,18 and the grit roller 18 protrudes only slightly above a plane defined by the surface of platen 34. Grit roller is preferably coated with an abrasive coating which might consist of fine flame-sprayed tungsten carbide, fine silica sand, or micro-machined surface grit material as is available from 3M Corporation of Maplewood, Minn. Furthermore, the friction or abrasive coating could comprise knurled metal, elastomer material, known rubber compounds, or embossed steel to name a few possible substitutes.

Figure 4:
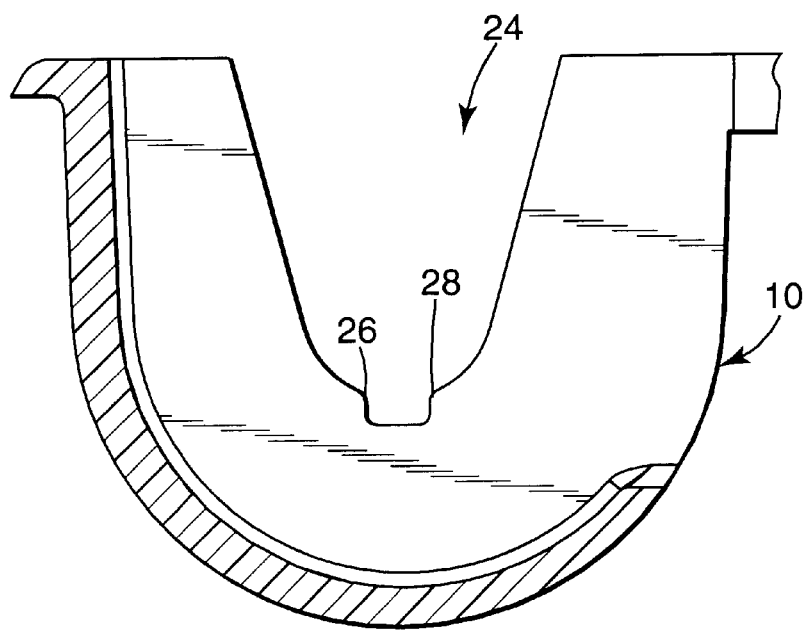
FIG. 4 is a cross-sectional view of the inventive slider bearing structure illustrating the detail of the structure intermediate between the two identical shaft-receiving channels of one embodiment of the present invention wherein the static rear portion of the structure is shown in the hatched portions of FIG. 4.

Referring now to FIG. 4, which is a cross sectional view of the inventive sliding bearing structure 10 illustrating the detail of the structure intermediate between the two identical shaft-receiving channels 24 of one embodiment of the present invention wherein the static rear portion of the structure is shown in the hatched portions of FIG. 4. This view illustrates an area of increased thickness (i.e., fillet between the wall and the floor) which is provided for increased structural integrity for the comprise the unitary bearing structure 10 which helps promote longer service life for the spring member 22 and thus of the entire bearing structure 10.

Figure 5:
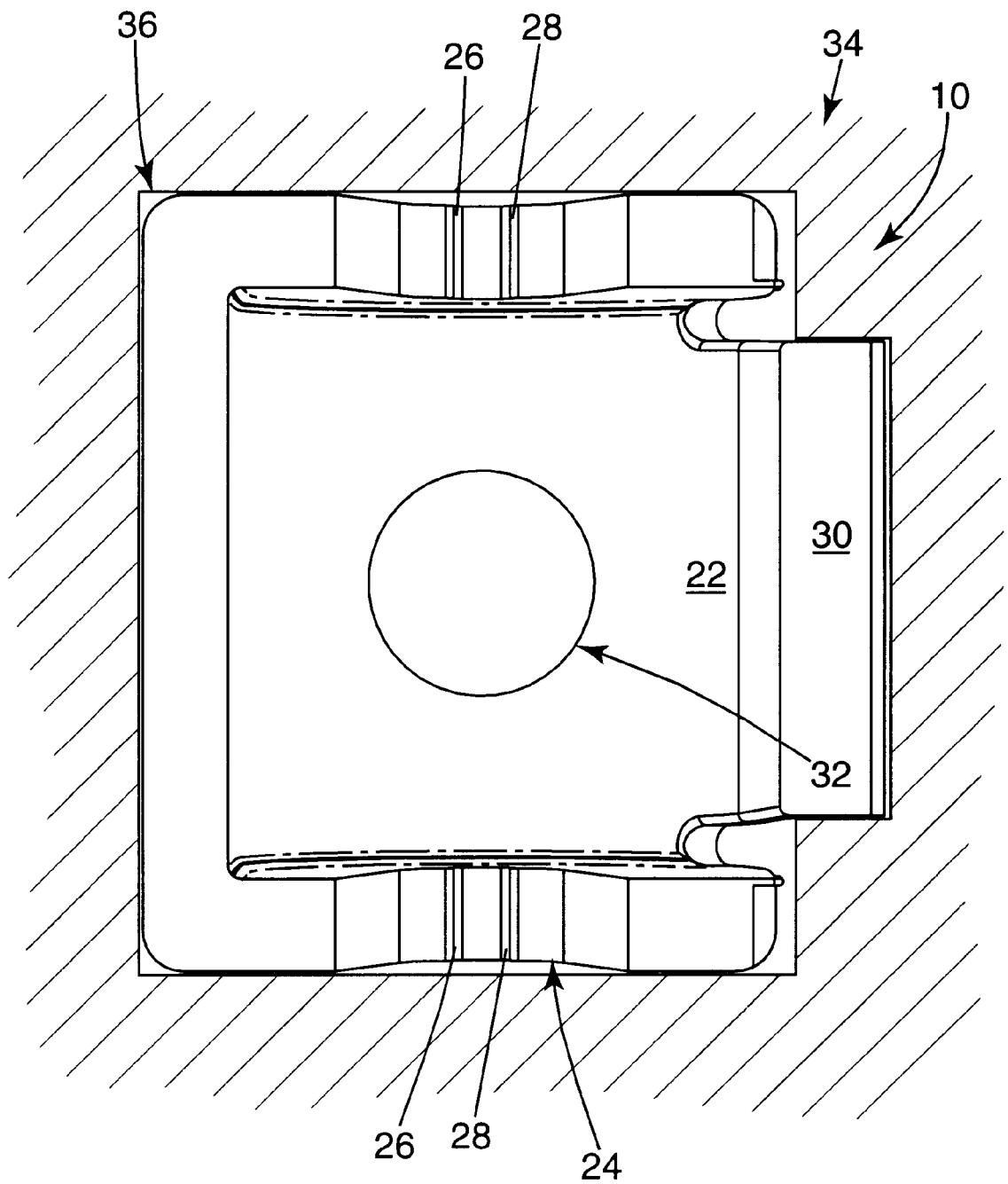
FIG. 5 is a plan view of the inventive self-lubricating slider bearing structure of the present invention fully illustrating the debris aperture for preserving the operation of the bearing structure in the event small mechanical parts or other debris fall into the bearing housing.

Referring now to FIG. 5, which is a plan view of the inventive sliding bearing structure 10 of the present invention fully illustrating the debris aperture 32 for preserving the operation of the bearing structure 10 in the event small mechanical parts or other debris fall into the cup-shaped structure which comprises the unitary bearing structure 10. The appropriately sized aperture 36 in the surface of platen 34 is also illustrated in FIG. 5.

Referring now to FIG. 6, which is a perspective view of a ink jet print engine having five (5) grit roller 18 paper driving arrangement useful for large format ink jet printing (i.e., over 3' in printing width) wherein the axial shaft 20 resides in a roller bay space inside of the printing platen 34 and only a portion of each grit roller 18 protrudes through the upper surface of said platen 34 and each roller receives a biased nip roller 12 which is suspended from an upper rail structure 38 to assist in propelling printing media across the printing platen 34.

Referring now to FIG. 7, which is a cross sectional view depicting an internal bay space for the axial shaft 20 within the printing platen34, the grit roller 18 protruding through the surface of platen 34 through a formed aperture 36 and a cooperating nip roller 12 and nip roller support shaft 14 used for propelling printing media across the platen 34.

The following examples are intended to convey a few practical implementations of the present invention in a form that briefly and concisely conveys the salient elements of the invention taught, enabled, and disclosed herein. Other forms of the present invention may be readily realized following exposure to the present disclosure, and the following examples are not to inhibit or narrow the full scope and breadth of the invention claimed herein. The full scope and breadth of the present invention shall be only limited by the claims appended hereto, including insubstantial variations and equivalents thereof.

EXAMPLE 1

An improved slider bearing for retaining a section of axial shaft one opposing sides of a friction roller disposed in an aperture of a printing platen adjacent a print zone, said improved slider bearing comprising:

a unitary portion of resin-based material formed as a container having structure on all sides except an open side, and having a first and a second set of boss members upwardly extending from a first C-shaped opening and a second C-shaped opening formed in opposing first and second container sides, wherein the C-shaped openings are formed to receive an axial shaft which axial shaft spans the first and second container sides, and wherein at least one of the remaining sides of the container provides a spring force to bias the container within an aperture sized to receive said container.

EXAMPLE 2

An improved bearing apparatus for biasing a section of axial shaft and a friction roller to a platen surface, without any portion of said bearing apparatus protruding above a plane defined by said platen surface, comprising:

a unitary portion of resin-based material formed as an container having structure on all sides except an open side, and having a first and a second set of boss members upwardly extending from a first C-shaped opening and a second C-shaped opening formed in opposing first and second container sides, wherein the C-shaped openings are formed to receive an axial shaft which axial shaft spans the first and second container sides, and wherein at least one of the remaining sides of the container provides a spring force to bias the container within a corresponding aperture formed in a printing platen surface, wherein said corresponding aperture is sized to receive said container.

EXAMPLE 3

An improved slider bearing apparatus, comprising:

a printing platen having an elongate compartment formed within said platen;

an axial shaft driven radially from one end and disposed within said elongate compartment;

a unitary member formed as an cup-shaped structure having a single open side, and having a first and a second set of boss members upwardly extending from a first C-shaped channel opening and a second C-shaped channel opening formed in opposing first and second sides of the cup-shaped structure, wherein the C-shaped channel openings are formed to receive the axial shaft which spans the first and second sides of the cup-shaped structure wherein said cup-shaped member retains a friction roller therein which has a central axis for rotation and said axial shaft is mechanically coupled to said central axis, and wherein at least one of the remaining sides of the cup-shaped container provides a spring force to bias the container within an aperture sized to receive said container.

EXAMPLE 4

An improved bearing apparatus, comprising:

a unitary portion of low friction resin material having structure on all sides except an open side, and having a first and a second set of boss members upwardly extending from a first C-shaped opening and a second C-shaped opening formed in opposing first and second container sides, wherein the C-shaped openings are formed to receive an axial shaft which axial shaft spans the first and second container sides, and wherein at least one of the remaining sides of the container provides a spring force to bias the container within an aperture sized to receive said container, wherein a friction roller is disposed between the first and second C-shaped openings and mechanically coupled to the axial shaft.

EXAMPLE 5

An improved slider bearing apparatus, comprising:

a resin-based semi-closed structure having one open side, and having a first and a second set of minute boss members upwardly extending from a first elongate channel opening and a second elongate channel opening formed in opposing first and second sides, wherein the first and second elongate channel openings are formed to receive an axial shaft which axial shaft spans the first and second sides, and wherein at least one of the remaining sides provides a spring force to bias the closed structure within an aperture sized to receive said structure, and wherein a friction roller is disposed between the first elongate channel opening and the second elongate channel opening and said friction roller is mechanically attached to the axial shaft so the friction roller rotates when the axial shaft rotates.

Although that present invention has been described with reference to discrete embodiments, no such limitation is to be read into the claims as they alone define the metes and bounds of the invention disclosed and enabled herein. One of skill in the art will recognize certain insubstantial modifications, minor substitutions, and slight alterations of the apparatus and method claimed herein, that nonetheless embody the spirit and essence of the claimed invention without departing from the scope of the following claims.

What is claimed is:

1. An improved bearing apparatus, comprising:
a unitary portion of resin-based material formed as an container having structure on all sides except an opening side, and having a first and a second set of boss members upwardly extending from a first C-shaped opening and a second C-shaped opening formed in opposing first and second container sides, wherein the C-shaped openings are formed to receive an axial shaft which spans the first and second container sides, and wherein at least one of the remaining sides of the container provides a spring force to bias the container within an aperture sized to receive said container.

2. The apparatus of claim 1, wherein the resin-based material is impregnated or coated with friction-reducing material at the first and second sets of boss members.

3. The apparatus of claim 1, wherein a raised shoulder portion is formed at the periphery of the opening side of the container to increase the engagement of the container within the aperture.

4. The apparatus of claim 1, wherein a cut-out aperture is disposed in a portion of the container that opposes the opening side.

5. The apparatus of claim 3, wherein the raised shoulder portion of the at least one of the remaining sides is further provided with an additional lip member to further enhance engagement of said container in said aperture.

6. The apparatus of claim 4, wherein a plane defined by an upper surface surrounding the aperture and a plane defined by the upper portions of unitary resin-based container are the same plane.

7. The apparatus of claim 4, wherein a plane defined by an upper surface surrounding the aperture lies above a plane defined by the upper portions of the unitary resin-based container.

8. The apparatus of claim 1, further comprising a nip roller biased to contact said unitary resin-based container.

9. The apparatus of claim 8, further comprising an axial shaft and supported by at least two unitary resin-based containers for cooperating at least two grit rollers disposed in said at least two unitary resin-based containers.

10. An improved slider bearing apparatus, comprising:
a printing platen having an elongate compartment formed within said platen;
an axial shaft driven radially from one end and disposed within said elongate compartment;

a unitary member formed as an cup-shaped structure having a single opening side, and having a first and a second set of boss members upwardly extending from a first C-shaped channel opening and a second C-shaped channel opening formed in opposing first and second sides of the cup-shaped structure, wherein the C-shaped channel openings are formed to receive the axial shaft which spans the first and second sides of the cup-shaped structure wherein said cup-shaped structure retains a friction roller therein which has a central axis for rotation and said axial shaft is mechanically coupled to said central axis, and wherein at least one of the remaining sides of the cup-shaped structure provides a spring force to bias the structure within an aperture sized to receive said structure.

11. The improvement of claim 10, wherein a plane defined by an upper surface surrounding the aperture and a plane defined by the upper portions of the cup-shaped structure are the same plane.

12. The improvement of claim 10, wherein a plane defined by an upper surface surrounding the aperture lies above a plane defined by the upper portions of the cup-shaped structure.

13. The improvement of claim 12, wherein the friction roller is coated over a media-engaging surface with flame sprayed tungsten.

14. The apparatus of claim 10 further comprising a nip roller disposed to cooperate with the friction roller.

\* \* \* \* \*